United States Patent
Marsh et al.

(10) Patent No.: US 8,290,541 B2
(45) Date of Patent: Oct. 16, 2012

(54) INTEGRATED INSTANT MESSAGING AND WEB BROWSING CLIENT AND RELATED METHODS

(75) Inventors: Shaun Marsh, Burlingame, CA (US); Michael Schultz, San Jose, CA (US); Paul Headley, Hollister, CA (US); Bill Kehoe, Moss Beach, CA (US)

(73) Assignee: Microfolio Data, LLC, Dover, DE (US)

( * ) Notice: Subject to any disclaimer, the term of this patent is extended or adjusted under 35 U.S.C. 154(b) by 0 days.

(21) Appl. No.: 12/799,033

(22) Filed: Apr. 16, 2010

(65) Prior Publication Data
US 2010/0279720 A1   Nov. 4, 2010

Related U.S. Application Data

(63) Continuation of application No. 11/673,490, filed on Feb. 9, 207, now Pat. No. 7,725,128.

(60) Provisional application No. 60/824,754, filed on Sep. 6, 2006.

(51) Int. Cl.
*H04B 1/38* (2006.01)
*H04M 1/00* (2006.01)
*G06F 15/16* (2006.01)

(52) U.S. Cl. .................. 455/566; 455/556.1; 709/203

(58) Field of Classification Search .......... 455/466, 455/406, 556.1, 556.2, 552.1, 566, 90.1; 705/51; 709/203, 206, 207
See application file for complete search history.

(56) References Cited

U.S. PATENT DOCUMENTS

| | | | |
|---|---|---|---|
| 5,771,354 A | 6/1998 | Crawford | |
| 6,263,447 B1 | 7/2001 | French | |
| 6,295,605 B1 | 9/2001 | Dockter | |
| 6,917,923 B1 * | 7/2005 | Dimenstein | 705/51 |
| 7,027,807 B2 | 4/2006 | Keller | |
| 7,089,585 B1 * | 8/2006 | Dharmarajan | 726/8 |
| 7,225,263 B1 | 5/2007 | Clymer et al. | |
| 7,593,000 B1 | 9/2009 | Chin | |
| 7,668,738 B2 | 2/2010 | Wiggins | |
| 7,725,128 B2 | 5/2010 | Marsh | |
| 2002/0049806 A1 | 4/2002 | Gatz et al. | |
| 2002/0065885 A1 | 5/2002 | Buonanno | |
| 2002/0083008 A1 | 6/2002 | Smith et al. | |

(Continued)

FOREIGN PATENT DOCUMENTS
KR   20020088023   11/2002

(Continued)

OTHER PUBLICATIONS

Stolowitz Ford Cowger LLP; Related Case Listing; Oct. 12, 2011; 2 Pages.

(Continued)

*Primary Examiner* — Un C Cho
(74) *Attorney, Agent, or Firm* — Stolowitz Ford Cowger LLP

(57) ABSTRACT

An integrated web browser, instant messaging system is presented. The system operates on mobile devices and other types of embedded devices. The system is an integrated instant messaging and web browsing application controlled by an embedded application on a mobile device. Today most web browsers, instant messaging, and other programs are separate or discrete applications that are executed on an either/or type of situation. The present system provides an integrated application environment that is a single application that shares data between instant messaging and web browser sub-modules, which allows users to simultaneously message and browse. The system may also be deployed as part of an overall method for enhancing safety and producing revenue for communications networks.

22 Claims, 4 Drawing Sheets

U.S. PATENT DOCUMENTS

| | | |
|---|---|---|
| 2003/0041108 A1 | 2/2003 | Henrick |
| 2004/0038690 A1 | 2/2004 | Lee et al. |
| 2004/0097217 A1 | 5/2004 | McClain |
| 2005/0039057 A1 | 2/2005 | Bagga et al. |
| 2005/0097106 A1 | 5/2005 | Lineman |
| 2005/0102407 A1 | 5/2005 | Clapper |
| 2005/0171999 A1* | 8/2005 | Bond et al. ............ 709/203 |
| 2005/0240960 A1 | 10/2005 | Nagtzaam |
| 2005/0268107 A1 | 12/2005 | Harris |
| 2006/0036868 A1 | 2/2006 | Cicchitto |
| 2006/0084472 A1 | 4/2006 | Park |
| 2006/0095369 A1 | 5/2006 | Hofi |
| 2006/0101127 A1 | 5/2006 | Brown |
| 2006/0121880 A1 | 6/2006 | Cowsar et al. |
| 2006/0161435 A1 | 7/2006 | Atef et al. |
| 2006/0191005 A1* | 8/2006 | Muhamed et al. ............ 726/15 |
| 2006/0265243 A1 | 11/2006 | Racho et al. |
| 2007/0142039 A1 | 6/2007 | Bushnell |
| 2007/0214354 A1 | 9/2007 | Renaud |
| 2008/0003996 A1* | 1/2008 | Strandell et al. ............ 455/420 |
| 2008/0059592 A1 | 3/2008 | Marsh |
| 2008/0098062 A1 | 4/2008 | Balia |
| 2008/0102766 A1 | 5/2008 | Schultz |
| 2008/0102790 A1 | 5/2008 | Schultz |
| 2008/0104188 A1 | 5/2008 | Oliver et al. |
| 2008/0288299 A1 | 11/2008 | Schultz |
| 2009/0007245 A1 | 1/2009 | Schultz |
| 2009/0265773 A1 | 10/2009 | Schultz |
| 2009/0305667 A1 | 12/2009 | Schultz |
| 2010/0279720 A1 | 11/2010 | Schultz |

FOREIGN PATENT DOCUMENTS

| | | |
|---|---|---|
| WO | 0169406 | 9/2001 |
| WO | 2008030287 | 3/2008 |
| WO | 2008054554 | 5/2008 |
| WO | 2008054555 | 5/2008 |
| WO | 2009128850 | 10/2009 |
| WO | 2009154635 | 12/2009 |

OTHER PUBLICATIONS

International Search Report and Written Opinion for PCT/US07/14329; dated Jan. 10, 2008; 7 Pages.

International Search Report and Written Opinion for PCT/US07/14416, dated Jan. 20, 2008; 8 Pages.

International Search Report and Written Opinion and IPRP; PCT/US07/14415; dated Aug. 25, 2008; 2 Pages.

International Search Report and Written Opinion and IPRP; PCT/US07/14416; dated.

International IPRP and Written Opinion; PCT/US08/067557; dated Oct. 19, 2010; 5 Pages.

International IPRP and Written Opinion; PCT/US08/069092; dated Dec. 21, 2010; 5 Pages.

Roman Shtykh et al.; Designing of Peer-to-Peer Groupware Integrated with Interactive Browser for Active Information Sharing and Collaboration Support; Proceedings of te Fourth International Conference on Computer and Information Technology 2004; IEEE; 6 Pages.

Yuechen Qian et al.; Exploring the Potentials of Combining the Photo Annotating Tasks with Instant Messaging Fun; MUM 2004; Oct. 27-29, 2004; College Park, Maryland; 7 Pages.

Eric Evans et al.; Using Java Applets and Corba for Multi-User Distributed Applications; University of Texas at Austin; IEEE Internet Computing; May Jun. 1997; 13 Pages.

John Heidemann et al.; Modeling the Performance of HTTP Over Several Transport Protocols; IEEE/ACM transactions on Networking, vol. 5, No. 5, Oct. 1997; 15 Pages.

* cited by examiner

INTEGRATED INSTANT MESSAGING AND WEB BROWSING CLIENT AND RELATED METHODS

RELATED APPLICATION

This application claims priority from and is a continuation of U.S. application Ser. No. 11/673,490, now U.S. Pat. No. 7,725,128, filed Feb. 9, 2007, which, in turn, claims the benefit of and priority to U.S. Provisional Application Ser. No. 60/824,754, filed Sep. 6, 2006, the contents of which are incorporated by reference herein in its entirety.

BACKGROUND

1. Field

The present invention relates to website browsing and instant messaging activities on cellular telephones, mobile devices, and other types of embedded devices.

2. General Background

In the last two decades, the deployment and use of mobile computing devices has grown such that a large percentage of people living in the United States, Europe, Asia, and other places have a least one device. Mobile phones, personal digital assistant's (PDAs), laptop computers and a host of similar devices are carried by people world wide as computer and connectivity devices.

At the same time, advancements in microprocessor technology and in communications protocol have provided many tools that are included in addition to the basic functions of the mobile devices. For example, mobile phones are equipped with games, address books, instant messaging systems, and web browsing system. Similarly, PDAs come equipped with similar suites of software in addition to the core systems and functions.

To minimize the size of these devices, extend the operating time (limited by batteries) and make them not only more attractive to carry, and other considerations, the computing capabilities are necessarily limited. The input mechanisms are often limited when compared to more traditional computing systems. These include numeric keypads on phones and keyboards operated by thumb in a "hunt and peck" method. More advanced PDA's have touch screens for input and output. These factors contribute to often cumbersome switching between application programs. Special applications are devised to provide functions and services such as instant messaging, email, and web browsing to compensate for the deficiencies. The mobile applications have been devised following the model used on the larger fixed based predecessor; the familiar computer. The application model in combination with limitations of the mobile platform has resulted in mobile software programs that allow users to execute one program at any given time with little or no visibility into the activities of other important programs executing concurrently. For instance, the user may be browsing the web or viewing a newly arrived instant message, but not simultaneously. These systems all suffer more or less equally from difficulty knowing when to switch between applications.

Web browsers comprise a class of software applications for transmitting data to-and-from server computers, as well as rendering documents returned by the those computers on the display of a local computer. A web browser enables a user to display and interact with instant, images, and other information typically located on a web page at a website on the World Wide Web or a local area network.

Similarly, a microbrowser (sometimes minibrowser or mobile browser) is a web browser designed for use on a handheld device such as a PDA or mobile phone. Microbrowsers are optimized so as to display internet content most effectively for small screens on portable devices and have small file sizes to accommodate the low memory capacity and low-bandwidth of wireless handheld devices.

Instance messaging client applications comprise a class of software applications for transmitting instant messages from one person to another over a computer or telephony network.

SUMMARY

An integrated web browser, instant messaging system is presented. The system operates on mobile devices and other types of embedded devices. The system is an integrated instant messaging and web browsing application controlled by an embedded application on a mobile device. Today most web browsers, instant messaging, and other programs are separate or discrete applications that are executed on an either/or type of situation. The present system provides an integrated application environment that is a single application that shares data between instant messaging and web browser sub-modules, which allows users to simultaneously message and browse. The system may also be deployed as part of an overall method for enhancing safety and producing revenue for communications networks.

According to a feature of the present disclosure, there is disclosed an instant messaging and web browsing system comprising an instant messaging subsystem, a web browsing subsystem, a display and control module adapted to operate the instant messaging subsystem and the web browsing subsystem substantially simultaneously, wherein a user may view instant messages or web page content and the instant messaging and web browsing system connect to a network.

Also disclosed according to a feature of the present disclosure is a machine-readable medium having program instructions stored thereon executable by a processing unit for performing the steps of receiving instant messages, sending instant messages, and receiving web page content, wherein receiving of instant messages, sending of instant messages, and receiving of web page content occurs substantially simultaneously.

According to a feature of the present disclosure, a mobile device comprising a processor, a memory, a network connection, and an integrated instant messaging and web browsing application executable by the processor for: receiving instant messages, sending instant messages, and receiving web page content.

Finally, according to a feature of the present disclosure, a method comprising providing a network offering, providing a software for use on mobile devices, preapproving a list of web site content to be downloadable to a mobile device, the pre-approval list being based on a criteria, and providing access via the software to the preapproved web site content.

DRAWINGS

The above-mentioned features and objects of the present disclosure will become more apparent with reference to the following description taken in conjunction with the accompanying drawings wherein like reference numerals denote like elements and in which.

DETAILED DESCRIPTION

The present inventors have devised a novel system method of providing functionality for users connected to mobile communication networks, such as a cellular phone networks. Disclosed is an instant messaging platform having an embedded web browser for Internet content. The system also comprises a display and control module, which provides the user interface for the dual instant messaging and web browsing sub-systems. Users are informed when an instant message has arrived and may discover who sent the message and the message content without the need to switch applications. In this system, users can easily move back-and-forth between instant messaging and web browsing activities using the user interface without the need to select and open a new program application on their mobile devices.

Moreover, the present inventors devised a novel business method of improving safety of children on the internet, as well as increasing revenues for communication networking companies. According to the methods, websites are preapproved prior to being made available to users of the network. Thus, access of offensive or dangerous website to children it prevented. Revenues are increased by only preapproving websites that pay the communication's network a fee.

Figure 1:
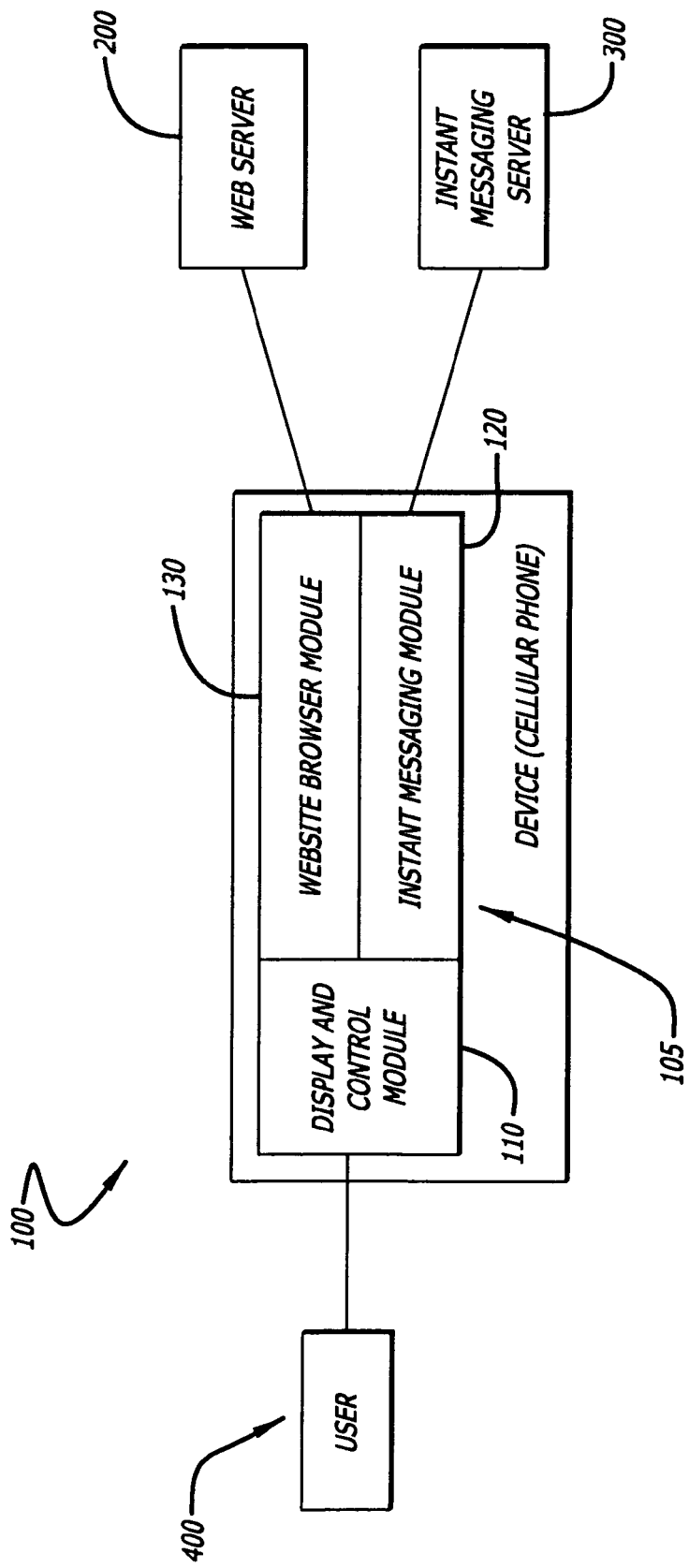
FIG. 1 is block diagram of an embodiment of the present disclosure showing in the interrelationship of the various components of the present disclosure.

According to embodiments shown in FIG. 1, mobile device 100 is shown having integrated instant messaging and web browsing system 105. Mobile device 100 is, according to embodiments, a mobile phone, personal digital assistant (PDA), other embedded devices, and the like. According to other embodiments, mobile device 100 may comprise a mobile computer. Artisans will recognize that although the principles of the present disclosure are couched in terms of mobile computing, the same principles are applicable to nearly any device capable of executing machine readable instructions.

Accordingly, integrated instant messaging and web browsing system 105 integrates both web browsing module 130, which provides a platform for viewing content from the interne, and instant messaging module 120, which provides a platform, for sending and receiving instant messages, into a single application. Instant messages may be any short message sent from a device to another device over a network. Integrated instant messaging and web browsing system 105 provides display and control module 110 to users 400 that allow users 400 to easily switch between instant messaging module 120 and web browsing module 130 (as shown in FIGS. 3A and 3B) and display web browsing module 130, instant messaging module 120, or both on the screen of mobile device 100.

Figure 2:
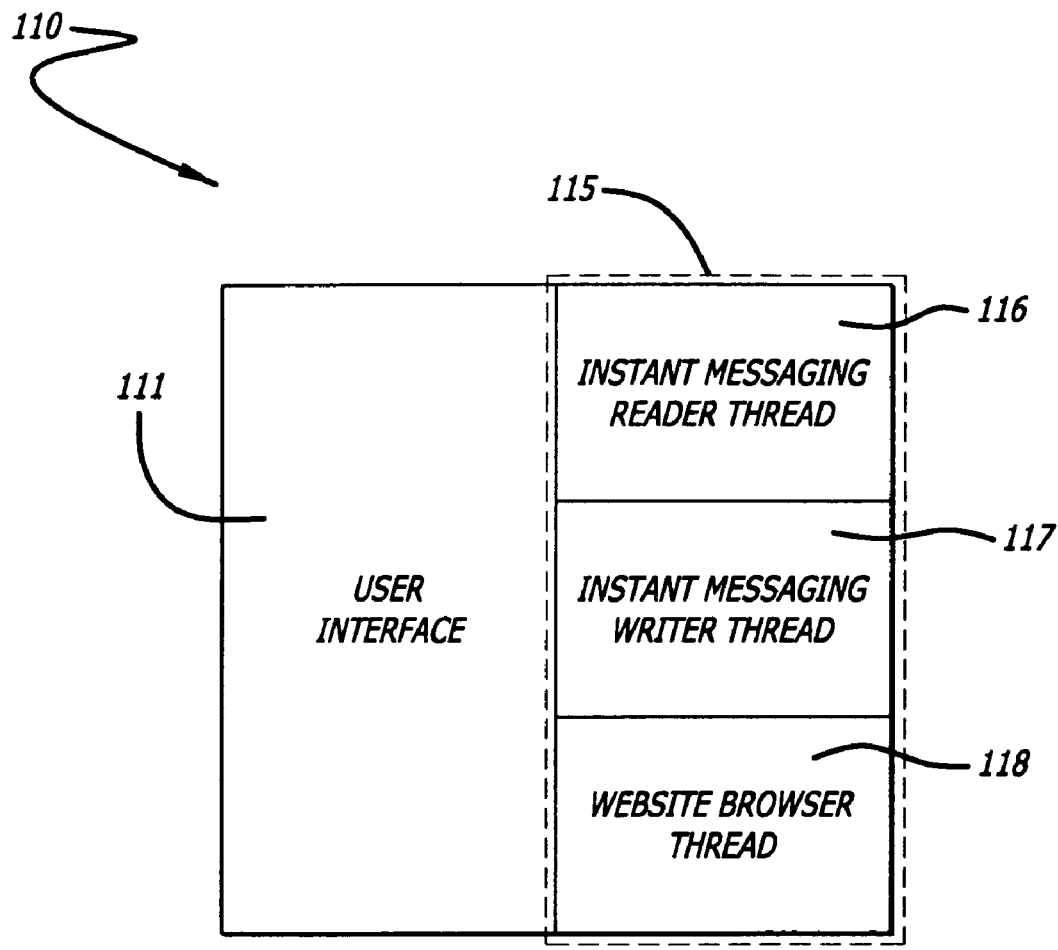
FIG. 2 is a block diagram of an embodiment of a display and control module of the present disclosure.

According to embodiments, for example as shown in FIG. 2, display and control module 110 manages all user interaction from a mobile device's input mechanism, such as the keypad of a mobile phone, manages separate threads of activities of integrated instant messaging and browsing system 105, including website browsing and instant messaging activities that may be executing in parallel, and displays content on the screen of mobile device 100. As shown according to the embodiment of FIG. 2, display and control module 110 comprises user interface 111 and background threads 115.

User interface 111 comprises a thread that captures inputs from user 400 and renders outputs from several background threads 115 executing in parallel, according to embodiments. User interface 111 comprises the following components: main window module 112, message bar 113, and input mechanisms and menu buttons module 114.

According to embodiments, main window module 112 renders the primary content selected by user 400 on a display. It may comprise rendering a web page on the display, an instant messaging dialog that is currently in progress on the display, or a system menu, according to embodiments. Similarly according to embodiments, main window module 112 displays instant messages and web browser content simultaneously (in parallel). Artisans will understand how to implement an appropriate output to a display without undue experimentation.

Likewise according to embodiments, message bar 113 conveys messages to user 400, including the arrival of new instant messaging messages, for example. According to embodiments, message bar 113 is super-imposed over the content of main window module 112 that is being displayed for a brief time while the message is conveyed to the user. According to similar embodiments, message bar 113 may occupy a portion of the display permanently, until cleared, or for a short period of time. The other contents of the display will be shifted around the portion of the display having message bar 113. According to still other embodiments, message bar 113 is "ticker tape"-type banner that occupies a relatively small portion of the display and provides user 400 with instant messaging alerts, such as an instant message received, or other messages from integrated instant messaging and browsing system 105 or mobile device 100. Accordingly, in some embodiments, user 400 will be able to choose the desired behavior of message bar 113 as a modifiable setting. According to embodiments, message bar 113 may also display a notification when each web page has completed downloading and rendering and is ready to be viewed.

Finally, input mechanisms and menu buttons module 114 allow user to interact with display and control module 110. They form a set of commands and inputs that are interpreted when the user activates specific input mechanisms on mobile device 100. According to embodiments, input mechanisms are buttons, thumb wheels, touch pads, touch screens, and other input mechanisms for mobile devices and non-mobile devices. Moreover, input mechanisms and menu buttons module 114 map commands to corresponding input mechanisms on a device. For example and as shown in FIG. 3A and FIG. 3B, the "Switch" and "Enter" commands are mapped to the buttons that they reside in closest proximity with. Another example is the input of text from the number pad of a cellular phone. Similarly, for example, menu items are navigated with arrow keys; as each menu option is navigated to with the arrow keys, it is highlighted. Pressing an "Enter" or "OK" button will send a command to select the highlighted option. Artisans will known and understand the many variations of mapping input mechanisms with commands and inputs.

Input from input mechanisms and menu buttons module 114 is interpreted based on the type of content in main window 112, according to embodiments. For example and according to embodiments, a down-arrow on mobile device 100 does not have a function (associated command to execute) when main window 112 is rendering an instant messaging dialog. However, it moves a logical cursor when main window 112 is rendering a system menu or a web page with links. Thus, input mechanisms and menu buttons module 114 may be context sensitive, depending on the thread or threads being shown on the display, according to embodiments.

Typically, for example, user 400 may be viewing a web page within main window 112 and receive a new instant messaging message, which is indicated to the user via message bar 113. User 400 may then continue with web browsing in main window 112 or execute a command using input mechanisms and menu buttons module 114 to switch to a revised main window 112 showing the instant messaging dialog and allow user 400 to engage in a conversation with another user.

Background threads 115, operating in parallel, comprise instant messaging reader thread 117, instant messenger writer thread 117, and web browser thread 118. Instant messaging reader thread 117 invokes instant messaging module 120 with instructions to accept messages sent by instant messaging server 300, according to embodiments. Similarly, instant messenger reader thread 117 interacts with user interface 111 to display incoming instant messages, according to embodiments. For example, instant messenger reader thread 117 causes message bar 113 to alert user 400 that a new instant message has arrived if content displayed by main window module 112 is displaying web pages; if the content displayed by main window module 112 is instant messaging, then instant messenger reader thread 117 causes the incoming message to be accordingly displayed.

According to embodiments, instant messaging writer thread 117 invokes the instant messaging module 120 with instructions to send messages to messaging server 300. Instant messaging writer thread 117 is invoked, according to embodiments, when user 400 activates input mechanisms and menu buttons module 114 with one or more commands wherein text is entered and a command indicating that the text that has been entered and is ready to pass to instant messaging module 120.

According to embodiments, web browser thread 118 invokes web browser module with instructions to request a specific web-based service and then caches (stores) the reply results. Web browser thread 118 also interacts with user interface 111 to both display stored web pages and receive input from user 400 directing instant messaging and web browsing system 105 to the webpages to be viewed. According to embodiments, users may directly input uniform resource indicator (URI) addresses to access specific webpages or may select webpages from a menu.

Each of instant messaging reader thread 117, instant messaging writer thread 117, web browser thread 118, and user interface 111 occur in parallel: instant messaging messages may be sent, instant messaging messages may be received, and web pages may be requested and cached for rendering simultaneously within the confines of a single program application, according to embodiments. Because each thread operates in parallel with the other threads, instant messaging messages, for instance, are received within instant messaging reader thread 117 while user 400 is making web page requests within the web browser thread 118.

According to embodiments, an internal application-programming interface (API)/callback mechanism is used to alert user interface 111 when one or more background threads 115 have performed an activity that requires rendering either in main window 112 or in message bar 113. According to embodiments, when instant message reader thread 117 receives a message, it calls the API within user interface 111, and then user interface 111 conveys that message in message bar 113. The other features are similarly communicated between the various modules, threads, and interfaces of the present disclosure.

Multiple web browser threads 118 may be invoked in parallel, according to embodiments. For example, user interface 111 may render one web page, the result of one thread, and then render the next web page, the result of another thread, as per user's 400 request as indicated by user 400 using input mechanisms and menu buttons module 114. According to embodiments, each web browser thread 118 comprises a main window module 112 content set; thus, user may use a "Switch" function to browse each individual display page of content much like opening individual web browser windows in traditional computing platforms.

Figure 3:
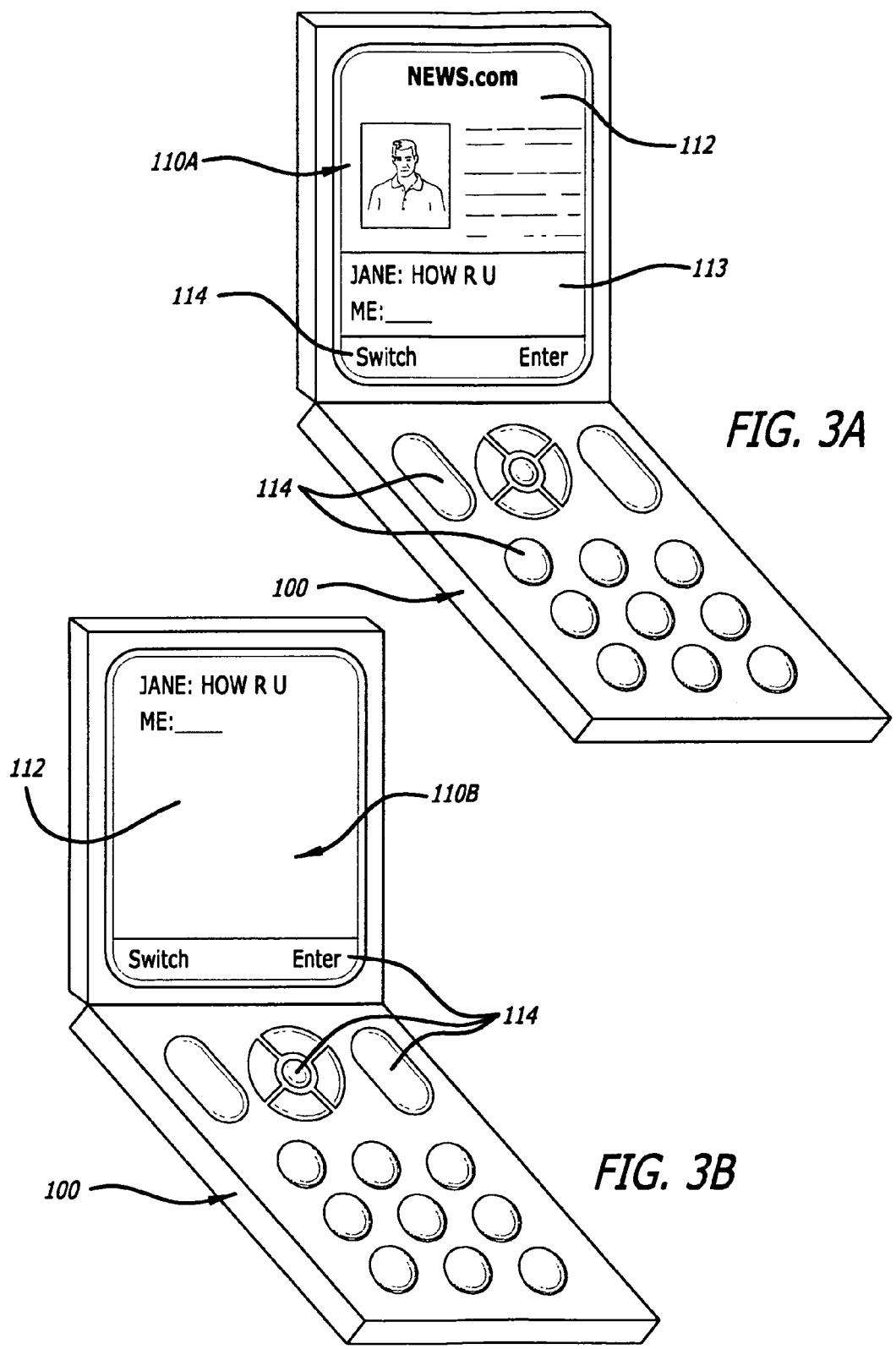
FIG. 3A is a perspective view of an embodiment of mobile device having the integrated instant messaging and web browser system.
FIG. 3B is a perspective view of an embodiment of mobile device having the integrated instant messaging and web browser system.

FIGS. 3A and 3B show mobile device 100 in two iterations. Display and control module 110A is configured to show both a webpage and a instant messaging area on the screen of mobile device 100. According to embodiments, user 400 may switch between various displays by activating a "Switch" command, for example. Pressing it once will "close" integrated web browser module 130 (shown as 110B). Artisans will recognize that as web browsing module 130 and instant messaging module 120 are part of a single program application, according to embodiments, "closing" integrated web browser module 130 or instant messaging module 120 merely causes the screen to display only web browser module 130 or instant messaging module 120 depending at the time the input is activated. The "closed" module remains available and will continue to operate in the background. Thus, a web page may be selected and web browser module 130 will load the webpage, even if the web browser module 130 screen is "closed" and instant messaging module 120 screen is activated. According to embodiments, a percentage of a screen may be devoted to web browsing module 130 and a percentage of a screen may simultaneously display instant messaging module (shown as 110A in FIG. 3).

According to embodiments, display and control module 110a also provides an integrated method of switching between instant messaging mode, as shown as a tool bar at the bottom of the screen with commands "Switch" and "Enter" corresponding with two keypad buttons on mobile device 100. Artisans will recognize that other commands may be mapped to a tool bar, according to embodiments. According to other embodiments, toolbar will be omitted to conserve screen space and users 400 must learn which commands correspond to which buttons on their respective input devices.

According to embodiments, web browser module 130 manages all interaction with external web servers 200 and assists display and control module 110 when rendering materials is returned by those web servers 200.

Likewise according to embodiments, instant messaging module 120 manages all interaction with external instant messaging servers 300 and assists display and control module 110 when rendering messages returned by those instant messaging servers 300.

Web browser module 130 and instant messaging module 120 operate in parallel, according to embodiments, so network messages may be received while websites are being browsed. Display and control module 110 may display materials received by web server 200, messages received by instant messaging server 300, or a combination of both types of materials if both types of materials are be received in parallel.

Communications between user 400 and the display of display and control module 110 is performed through the physical interface provided by mobile device 100. For a cellular telephone, for example, this comprises a display screen, keypad, and other input mechanisms built into the telephone. Similarly, for PDAs may comprise a screen, keyboard and other buttons, thumbwheel, touch screen, or combinations thereof. Depending on the device, artisans will recognize the applicable input mechanisms that may be employed to operate the systems and methods of the present disclosure.

According to embodiments, display and control module 110 is configurable to ensure that user 400 may only request specific web sites. If this configuration has been employed, then display and control module 110 will only allow those specific web server addresses to be passed to the web browser module 130. Thus, according to embodiments integrated instant messaging and browsing system 105 provides a platform in which responsible parties for mobile device 100 may filter content viewed by users 400. Moreover according to embodiments, mobile communications companies may contract with web sites to provide their website to users 400 of the mobile communications company via integrated instant messaging and web browser system 105, providing an additional source of revenue to the mobile communications company.

According to embodiments, integrated instant messaging and browsing system 105 works in conjunction with existing instant messaging servers 300 and web servers 200. Thus, communications networks need not install any additional server software because integrated instant messaging and web browsing system 105 seamlessly connects to existing instant messaging servers 300 and web servers 200.

Integrated instant messaging and web browsing system 105 may either be preloaded on mobile device 100 at part of the operating system, embedded on a chip contained within mobile device 100 (i.e., be "embedded"), or as an add-on program application. Users 400 may also download and install integrated instant messaging and web browsing system 105, according to embodiments.

According to embodiments, communications between the website browser module 130 and web servers 200 is performed using the Hypertext Transfer Protocol (HTTP). Accordingly, other protocols are similarly contemplated, according to embodiments including, DHCP, DNS, FTP, IMAP4, IRC, MIME, POP3, SIP, SMTP, SNMP, SSH, TELNET, HTTP, HTTPS, BGP, RPC, RTP, RTCP, TLS/SSL, SDP, SOAP, L2TP, PPTP, and others known and understood by artisans, according to embodiments. According to embodiments, website browser module 130 communicates with web servers 200 via TCP internet protocol, which in turn can operate over any of several types of physical networks, including cellular phone networks. Other communications protocols are likewise contemplated according to embodiments, such as TCP, TCP/IP, UDP, DCCP, SCTP, GTP, WAP Datagram protocol, and others that would be known and understood by artisans.

According to embodiments, communications between the instant messaging module 120 and instant messaging server 300 is performed using the Extensible Messaging and Presence Protocol (XMPP), according to embodiments. Other instant messaging protocols are likewise contemplated, including Gadu-Gadu, Cspace, IRC, Meca Network, MSNP, OSCAR, Protocol for Synchronous Conferencing, TOC, TOC2, SIP/SIMPLE, Yahoo Messenger, DirectNet, XMPP, Zephyr Notification, Gale, Skype, and combinations thereof, according to embodiments. Instant messaging module 120 also operates over the TCP Internet Protocol, according to embodiments, and may also operate over any of several types of physical networks as previously described. Other communications protocols are likewise contemplated according to embodiments, such as TCP, TCP/IP, UDP, DCCP, SCTP, GTP, WAP Datagram protocol, and others that would be known and understood by artisans.

The integrated instant messaging and web browsing system 105 and method herein may be described in the general context of computer-executable instructions, such as program modules, being executed by a computer. Generally, program modules include routines, programs, objects, components, data structures, etc. that perform particular tasks or implement particular abstract data types. The system may also be practiced in distributed computing environments where tasks are performed by remote processing devices that are linked through a communications network. In a distributed computing environment, program modules may be located in both local and remote computer storage media including memory storage devices. The computer programs are stored in a memory medium or storage medium or they may be provided to a processing unit through a network or I/O bus.

In one aspect, integrated instant messaging and web browsing system 105 disclosed includes at least one central processing unit (CPU) or processor. The CPU can be coupled to a memory, ROM or computer readable media containing the computer-executable instructions for generating and using fingerprints for integrity management. Computer readable media can be any available media that can be accessed by the system and includes both volatile and nonvolatile media, removable and non-removable media implemented in any method or technology for storage of information such as computer readable instructions, data structures, program modules or other data. Computer storage media includes, but is not limited to, RAM, ROM, EEPROM, flash memory, portable memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the fingerprint generation and matching systems. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared, and other wireless media. Combinations of any of the above should also be included within the scope of computer readable media. The computer readable media may store instructions or data which implement all or part of the system described herein.

Figure 4:
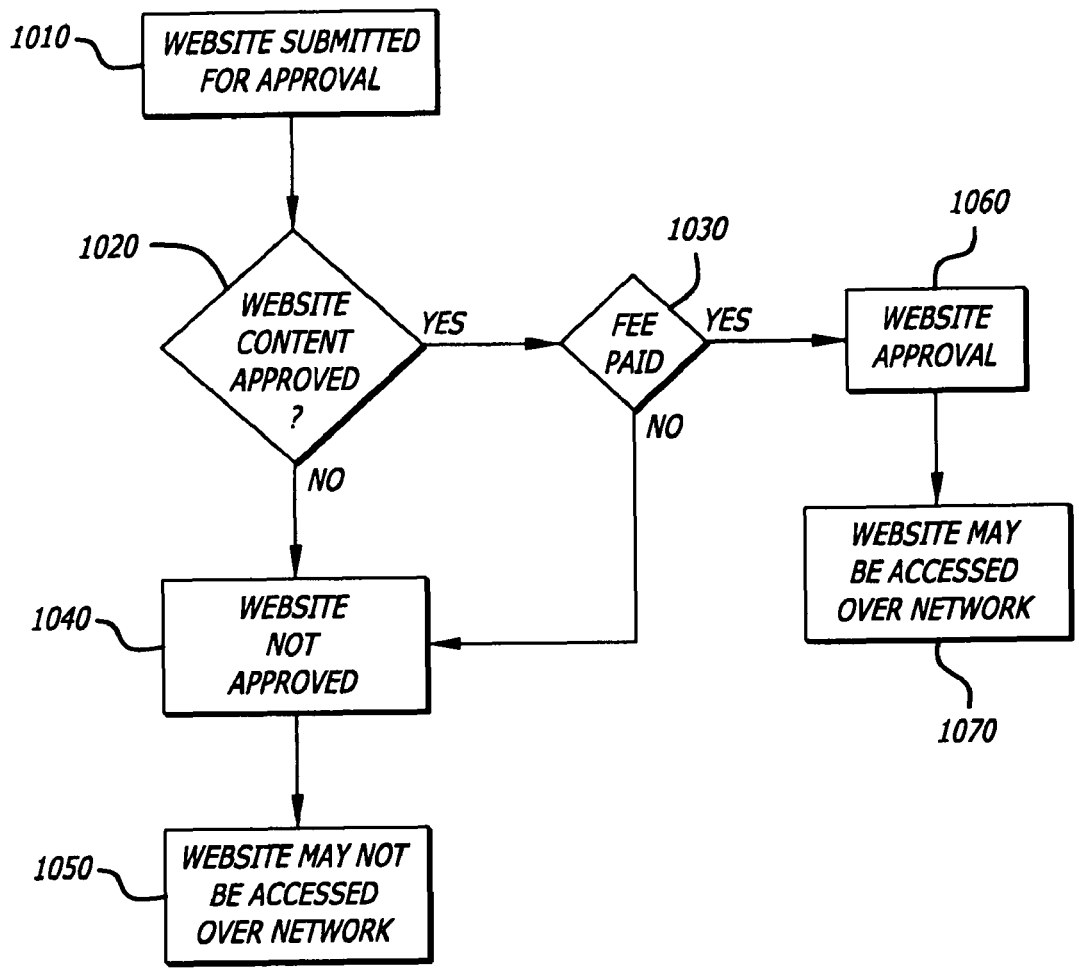
FIG. 4 is a flow chart of an embodiment of a method of offering internet content over a network.

Also disclosed herein and shown in FIG. 4 are business methods for wireless communications companies. According to embodiments, wireless communications companies may employ the use of a software suite, such as integrated instant messaging and web browsing system 105 disclosed herein. The mobile communications company, according to embodiments, allows access only to websites preapproved by the mobile communications company. Accordingly, by limiting users access to only preapproved web content, mobile communications companies may provide a value added to parent and guardians who are worried about the content their children view on the internet. Moreover, according to embodiments, by making the list of preapproved website available to parents and guardians, the parents and guardians may know exactly what content is viewable on children's mobile communications devices.

Similarly and according to embodiments, mobile communications companies may earn revenue by preapproving only web sites that subscribe to the mobile communications companies' approval list. For example, ACME.com may offer child friendly content of cartoon episode recaps. ACME.com would be attractive and safe for children to view, which would make ACME.com eligible to be included in the preapproved websites available to children. However, the mobile communications company would not include ACME.com until ACME.com paid a set price to be listed and available to subscribers of the mobile communications network.

According to an embodiment, a website is submitted to an entity having a network with which mobile device can communicate 1010. The first step, according to an embodiment, is a process of screening the content of the website 1020. After the content is found to be nonobjectionable, the website must pay a fee to the entity having a network 1030. The fee payment and content approval steps may be juxtaposed according to embodiments. According to still other embodiments, the step requiring payment of a fee 1030 is optional and may be omitted from the method. If either the content is not approved or a fee is not paid, the website is not approved 1040 and users of the network will be unable to access the website 1050. Conversely, it the website is approved 1060, users of the network will be able access the website via the network and view the contents of the website 1070.

Accordingly, a preapproved website list may be included as part of the software suite provided on user's mobile device that is compatible with a given network. Thus, users would not be able to directly type in URI and view the content of the URI, but would rather select an available website from a preexisting list built into the software. To that end, according to embodiments, mobile communications companies may sort websites according to the subscription fee paid by the website to make those that paid a higher subscription fee more visible to subscribers to the mobile communication company's network.

According to still similar embodiments, available networks are categorized (e.g., news, sports, children's, television, etc.). Thus, users navigate to a website after navigating to a specific category. According to embodiments, the first available websites shown would be those that paid a premium subscription rate.

While the apparatus and method have been described in terms of what are presently considered to be the most practical and effective embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A mobile device, comprising:
a memory configured to store instructions corresponding to an embedded application on the mobile device that integrates a messaging function and a browsing function; and
a processor configured to execute the instructions to:
control an activity thread corresponding to the messaging function substantially simultaneously with an activity thread corresponding to the browsing function;
cause display of messages received or sent resulting from the activity thread corresponding to the messaging function on a first portion of a monitor substantially simultaneously with a display of webpage data resulting from the activity thread corresponding to the browsing function on a second portion of the monitor; and
switch the display of messages received or sent on the first portion of the monitor with the display of webpage data on the second portion of the monitor in response to an input.

2. The mobile device of claim 1, wherein the processor is configured to execute the instructions corresponding to the embedded application to wirelessly transmit an outbound text message to a second device or to wirelessly receive an inbound text message from the second device.

3. The mobile device of claim 2, wherein the processor is configured to execute the instructions to corresponding to the embedded application to cause display of a notification icon in response to wirelessly receiving the inbound text message.

4. The mobile device of claim 2, wherein the processor is configured to execute instructions to corresponding to the embedded application to wirelessly transmit a request for content to a global communications network.

5. The mobile device of claim 4, wherein the processor is configured to execute the instructions corresponding to the embedded application to wirelessly receive the content from the global communications network.

6. The mobile device of claim 4, wherein the processor is configured to execute the instructions corresponding to the embedded application to wirelessly receive only approved content from the global communications network.

7. A device, comprising:
a memory configured to store instructions corresponding to messaging application and a browsing application; and
a processor configured to execute the instructions to:
control an activity thread corresponding to the messaging application substantially simultaneously with an activity thread corresponding to the browsing application;
cause display of data resulting from the activity thread corresponding to the messaging application substantially simultaneously with a display of data resulting from the activity thread corresponding to the browsing application;
cause display of the data resulting from the activity thread corresponding to the messaging application on a first portion of a display screen; and
cause display of the data resulting from the activity thread corresponding to the browsing application on a second portion of the display screen; and
switch display of the data resulting from the activity thread corresponding to the messaging function from the first portion to the second portion of the display screen substantially simultaneously with switching display of the data resulting from the activity thread corresponding to the browsing function from the second portion to the first portion of the display screen.

8. An apparatus, comprising:
means for storing instructions corresponding to an application embedded on the apparatus that integrates a messaging function and a browsing function;
means for managing an activity thread resulting from execution of the instructions corresponding to the messaging function substantially simultaneously with an activity thread resulting from execution of the instructions corresponding to the browsing function;
means for displaying messages received or sent corresponding to the activity thread corresponding to the messaging function on a first portion of a display substantially simultaneously with displaying web data corresponding to the browsing function on a second portion of the display; and means for switching the display of messages received or sent on the first portion of the display with the display of webpage data on the second portion of the display in response to an input.

9. The apparatus of claim 8, further comprising:
means for wirelessly transmitting an outbound text message to a device; and
means for wirelessly receiving an inbound text message from the device.

10. The apparatus of claim 9, further comprising means for displaying a notification icon in response to wirelessly receiving the inbound text message.

11. The apparatus of claim 9, further comprising means for wirelessly transmitting a request for content to a global communications network.

12. The apparatus of claim 11, further comprising means for wirelessly receiving the content from the global communications network.

13. The apparatus of claim 11, further comprising means for blocking the content from display in response to disapproving the content.

14. An apparatus, comprising:
means for storing instructions corresponding to a messaging application and a browsing application;
means for managing an activity thread resulting from execution of the instructions corresponding to the messaging application substantially simultaneously with an activity thread resulting from execution of the instructions corresponding to the browsing application;
means for displaying data of the activity thread corresponding to the messaging application substantially simultaneously with displaying data of the browsing application;
means for displaying the data corresponding to the messaging application on a first portion of a display screen;
means for displaying the data corresponding to the browsing application on a second portion of the display screen; and
means for switching display of the data corresponding to the messaging application from the first portion to the second portion of the display screen substantially simultaneously with switching display of the data corresponding to the browsing application from the second portion to the first portion of the display screen.

15. A method, comprising:
controlling an activity thread corresponding to a messaging function operating on a mobile device substantially simultaneously with controlling an activity thread corresponding to a browsing function operating on the mobile device;
displaying messages received or sent resulting from controlling the activity thread corresponding to the messaging function on a first portion of a screen substantially simultaneously with displaying web data resulting from controlling the activity thread corresponding to the browsing function on a second portion of the screen; and
switching displaying messages received or sent on the first portion of the screen with displaying webpage data on the second portion of the screen in response to an input;
wherein the messaging function and the browsing function are integrated in an application operating on the mobile device.

16. The method of claim 15, further comprising wirelessly transmitting an outbound text message to a second device or wirelessly receiving an inbound text message from the second device.

17. The method of claim 16, further comprising displaying a notification icon in response to wirelessly receiving the inbound text message.

18. The method of claim 15, further comprising wirelessly transmitting a request for content to a global communications network.

19. The method of claim 18, further comprising wirelessly receiving the content from the global communications network.

20. The method of claim 18, further comprising wirelessly receiving only approved content from the global communications network.

21. The method of claim 15, substantially simultaneously executing instructions corresponding to the messaging application and instructions corresponding to the browsing application.

22. A method comprising:
controlling an activity thread corresponding to a messaging application operating on a device substantially simultaneously with controlling an activity thread corresponding to a browsing application operating on the device;
displaying data resulting from controlling the activity thread corresponding to the messaging application substantially simultaneously with displaying data resulting from controlling the activity thread corresponding to the browsing application;
displaying the data corresponding to the messaging application on a first portion of a display screen; and
displaying the data corresponding to the browsing application on a second portion of the display screen; and
switching display of the data corresponding to the messaging application from the first portion to the second portion of the display screen substantially simultaneously with switching display of the data corresponding to the browsing application from the second portion to the first portion of the display screen.

* * * * *

UNITED STATES PATENT AND TRADEMARK OFFICE
CERTIFICATE OF CORRECTION

PATENT NO.       : 8,290,541 B2
APPLICATION NO.  : 12/799033
DATED            : October 16, 2012
INVENTOR(S)      : Marsh et al.

It is certified that error appears in the above-identified patent and that said Letters Patent is hereby corrected as shown below:

On the Title Page
Item (63), under "Related U.S. Application Data", Line 2, delete "Feb. 9, 207," and insert -- Feb. 9, 2007, --, therefor.

On Page 2, Item (56), under "OTHER PUBLICATIONS", Line 15, delete "of te" and insert -- of the --, therefor.

On Page 2, Item (56), under "OTHER PUBLICATIONS", Line 23, delete "May Jun." and insert -- May-Jun. --, therefor.

In the Specifications
In Column 1, Line 24, delete "have a least" and insert -- have at least --, therefor.

In Column 2, Line 63, delete "is" and insert -- is a --, therefor.

In Column 3, Line 49, delete "interne," and insert -- internet, --, therefor.

In Column 3, Line 50, delete "platform," and insert -- platform --, therefor.

In Column 4, Line 57, delete "known" and insert -- know --, therefor.

In Column 6, Line 14, delete "a instant" and insert -- an instant --, therefor.

In Column 6, Line 59, delete "are be" and insert -- are being --, therefor.

In the Claims
In Column 12, Line 31, in Claim 22, delete "method" and insert -- method, --, therefor.

Signed and Sealed this
Ninth Day of April, 2013

Teresa Stanek Rea
*Acting Director of the United States Patent and Trademark Office*